United States Patent [19]
Dufour et al.

[11] Patent Number: 4,796,988
[45] Date of Patent: Jan. 10, 1989

[54] PROGRESSIVE LENS

[75] Inventors: Maurice Dufour, Paris; Gérard Obrecht, Issy Les Moulineaux, both of France

[73] Assignee: Essilor International Compagnie Generale d'Optique, Creteil, France

[21] Appl. No.: 906,249

[22] Filed: Sep. 12, 1986

[30] Foreign Application Priority Data

Sep. 13, 1985 [FR] France ................. 85 13614

[51] Int. Cl.$^4$ ................. G02C 7/06
[52] U.S. Cl. ................. 351/169; 351/171
[58] Field of Search ................. 351/168-172

[56] References Cited

U.S. PATENT DOCUMENTS

| | | | |
|---|---|---|---|
| 1,427,192 | 8/1922 | Bugbee | 351/171 |
| 3,711,191 | 1/1973 | Tagnon | 351/169 |
| 4,056,311 | 11/1977 | Winthrop | 351/169 |
| 4,418,992 | 12/1983 | Davenport et al. | 351/169 |
| 4,461,550 | 7/1984 | Legemdre | 351/169 |
| 4,484,804 | 11/1984 | Mignen | 351/171 X |
| 4,580,883 | 4/1986 | Shinohara | 351/169 |

FOREIGN PATENT DOCUMENTS

| | | |
|---|---|---|
| 1152369 | 8/1983 | Canada . |
| 0027339 | 4/1981 | European Pat. Off. . |
| 0039497 | 11/1981 | European Pat. Off. . |
| 2495789 | 6/1982 | France . |
| 2526964 | 11/1983 | France . |
| 2533708 | 4/1984 | France . |
| 2128361 | 4/1984 | United Kingdom . |
| 2162964 | 2/1986 | United Kingdom . |

*Primary Examiner*—John K. Corbin
*Assistant Examiner*—Scott J. Sugarman
*Attorney, Agent, or Firm*—Charles E. Brown; Charles A. Brown

[57] ABSTRACT

A progressive lens with a continuous surface comprises three substantially constant power areas. A first such area is mathced to far vision, a second to near vision and a third, between the first and second areas, to intermediate vision. Respective progressively varying power areas lie between the first and third areas and between the third and second areas. A predetermined progress meridian passing through these substantially constant power areas may have substantially umbilical parts between the substantially constant power areas.

2 Claims, 2 Drawing Sheets

PROGRESSIVE LENS

BACKGROUND OF THE INVENTION

1. Field of the Invention

The invention concerns a progressive lens improved so as to take account, among other things, of new working conditions that may be encountered by increasingly large numbers of persons wearing prescription eyeglasses.

2. Description of the Prior Art

So-called "progressive" lenses are well-known in the field of ophthalmic lenses. A lens of this kind comprises two substantially constant power areas for far vision and near vision, respectively, and between these two areas a third area of progressively varying focal power. In practise an area of a progressive lens is considered to be of constant power if the power at each point does not differ by more than a specific amount, for example 0.12 diopters, from its nominal value. In practise the substantially constant power area corresponding to far vision is disposed in the upper part of the eyeglass lens and the constant power area corresponding to near vision is disposed in the lower part of the same lens, these two areas being joined by the progressively varying power area without any surface discontinuity. Thus between the two substantially constant power areas there is a region whose power varies continuously between the two power values of the aforementioned two areas. This region corresponds to viewing distances intermediate the viewing of far objects and the viewing of near objects.

It has been known for some time that such lenses are ill-suited to certain tasks. A refined investigation of this phenomenon has indicated that nowadays more and more people need to accommodate to prolonged observation at medium distances, corresponding to neither of the usual stable vision areas. This type of problem, of relatively recent origin, is encountered in particular when an eyeglass wearer has to work regularly and for relatively long periods at a computer terminal or word processing machine visual display screen. In this case the eyeglass wearer is obliged to view the screen on the primary position of his sight axis, that is to say in a direction that is inclined slightly downwards relative to the horizontal. Also, the screen is situated at an intermediate distance, in particular as it is separated from the eyeglass wearer by a keyboard, which the eyeglass wearer views along the normal axis for viewing near objects and at a distance substantially equal to the near vision distance.

Known progressive lenses do not suit such requirements. Doing so is the object of this invention.

SUMMARY OF THE INVENTION

The invention consists in a continuous surface progressive lens comprising a substantially constant power first area matched to far vision, a substantially constant power second area matched to near vision, a substantially constant power third area between said first and second areas matched to intermediate vision and respective progressively varying power areas between said first and third areas and between said third and second areas.

In order to minimize the discomfort which might be experienced on moving the visual axis along the principal progression meridian between the far vision area and the near vision area, the progressive parts of this meridian situated between the aforementioned constant power areas are substantially umbilical, so minimizing astigmatism over all the length of this meridian.

The invention will be better understood from the following description of a progressive lens in accordance with the invention given by way of example only and with reference to the accompanying drawings.

DESCRIPTION OF THE PREFERRED EMBODIMENT

The curves and characteristics set out in FIGS. 1 through 4 are sufficient to enable those skilled in the art to make an eyeglass lens in accordance with the invention utilizing known techniques. In the example specifically described the lens is circular and is shown centered relative to two imaginary orthogonal axis X'X and Y'Y. The chosen specifications are as follows:

The lens characteristics are symmetrical relative to the Y'Y axis which thus represents its principal progression meridian.

It comprises a first substantially constant power area VL matched to far vision; in this example the power P expressed in diopters is null, meaning that the lens is designed for a person with normal far vision.

It comprises a second substantially constant power area VP matched to near vision; in the example the power of this area is in the region of two diopters. The area VL is in the upper part of the lens and the area VP in the lower part, considering the lens in the normal position before the eye. It should be noted, however, that as the lens is symmetrical it will be immobilized in the frame in such a way that the Y'Y axis is inclined to the vertical to allow for the fact that the eyes converge towards the nose on changing from far vision to near vision.

Figure 1:
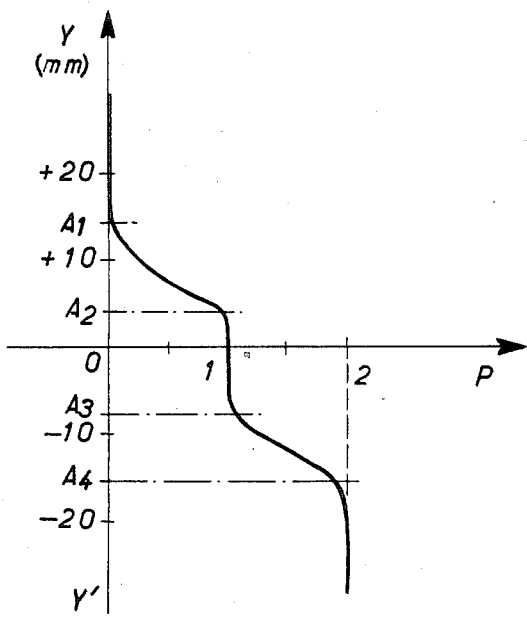
FIG. 1 is a graph showing the variation of power along the principal progression meridian of an eyeglass lens in accordance with the invention.
Figure 2:
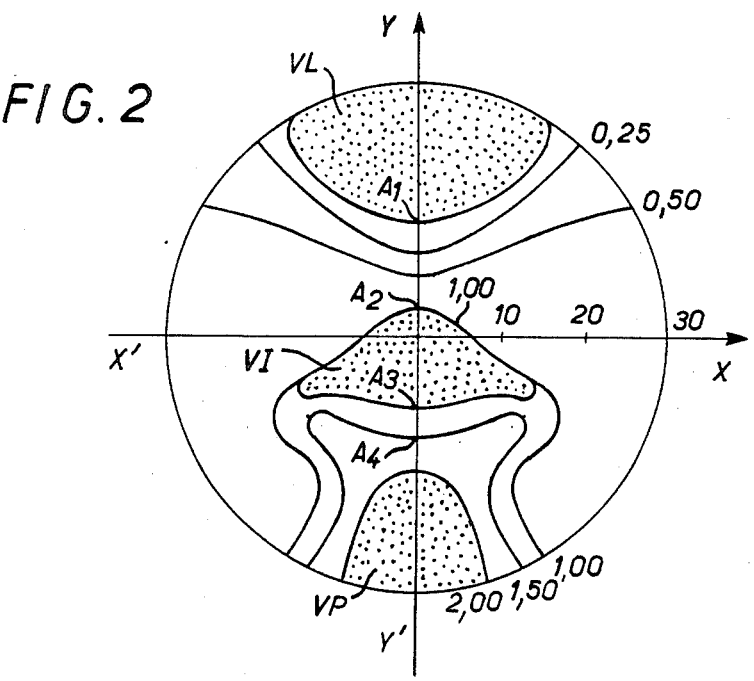
FIG. 2 shows the lens itself on which are represented the substantially constant power areas and the lines of constant power of the surface, as expressed in diopters.
Figure 3:
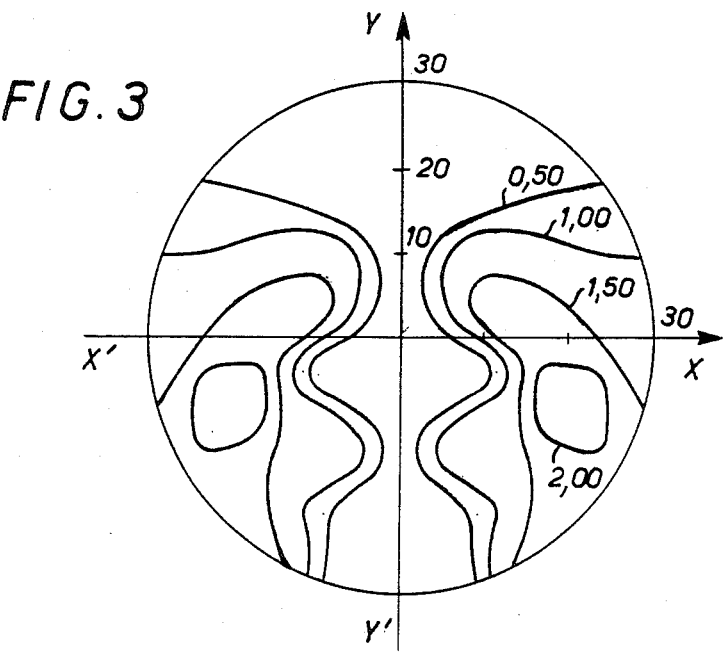
FIG. 3 is a view analogous to FIG. 2 showing curves of equal astigmatism as expressed in diopters.

Finally, and in accordance with the invention, the lens comprises a third substantially constant power area VI matched to viewing a subject at an intermediate distance. In the example the power P of this third area is in the region of one diopter. The area VI is disposed between said first and second areas VL and VP. It is approximately at the center of the lens and slightly offset downwards. The areas VL, VP and VI are shown shaded in FIG. 2. The limits of the constant power areas along the principal progression meridian Y'Y are shown in FIGS. 1 and 2 by the point A1 approximately 15 mm from the center in the case of the area VL, the points A2 and A3 respectively approximately +4 mm and −7 mm from the center in the case of the area VI, and the point A4 approximately 15 mm from the center in the case of the area VP. Between the points A1 and A2 on the one hand and between the points A3 and A4 on the other hand there are areas in which the power varies progressively between 0 and 1 diopter on the one hand and between 1 and 2 diopters on the other hand, the configurations of these being shown more precisely by the 0.25, 0.50, 1 and 1.5 diopter curves of equal power shown in FIG. 2. In practise each of the constant power areas may be formed by a substantially spherical surface of selected radius of curvature. The meridian Y'Y crosses the areas VL, VP and VI and it emerges from what has previously been said that these areas are symmetrical relative to it. Between the area VL and the area VI on the one hand and between the area VI and the area VP on the other part the power varies progressively (FIG. 1).

Figure 4:
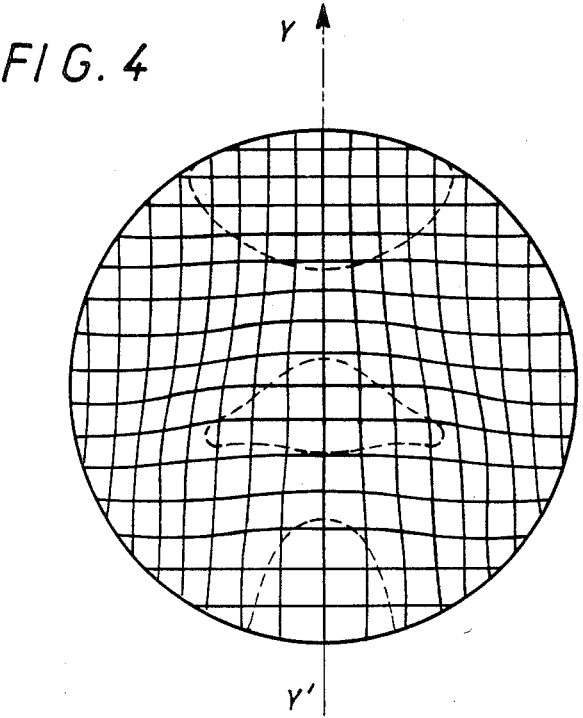
FIG. 4 shows the image of a grid of regular squares as transmitted by the progressive lens in accordance with the invention.

In accordance with another advantageous characteristic of the invention the parts of the meridian Y'Y situated between said substantially constant power areas (that is to say along the lines A1-A2 and A3-A4) are substantially umbilical. In other words, in the vicinity of any point along the lines A1-A2 and A3-A4 the principal radii of curvature of the surface of the lens are substantially equal. This specific feature affects the astigmatism characteristics of the lens, as clearly illustrated in FIG. 3 where it is seen that there is no astigmatism any where in the vicinity of the main progression meridian Y'Y. The result is greater comfort for the user when his axis of vision sweeps along the meridian to move from far vision to near vision or vice versa. The same result is shown in FIG. 4 where it is seen that the squares of the grid are not substantially deformed in each of the constant power areas and very little deformed between these areas in the vicinity of the meridian.

It will be understood that the present invention is not limited to the embodiment described and shown but encompasses any variant execution. In particular, the foregoing description refers to a lens of symmetrical structure relative to the principal progression meridian. As an alternative to this, the invention is equally applicable to a lens of disymmetric structure as described, for example, in French patent application No. 2 058 499 and applications for patents of addition thereto.

We claim:

1. Continuous surface progressive lens comprising a substantially constant power first area matched to far vision, a substantially constant power second area matched to near vision, a substantially constant power third area between said first and second areas matched to intermediate vision and respective progressively varying power areas between said first and third areas and between said third and second areas.

2. Progressive lens according to claim 1, comprising a predetermined progression meridian passing through said substantially constant power areas with substantially umbilical parts between said substantially constant power areas.

* * * * *